United States Patent
Chiang

(10) Patent No.: US 8,390,154 B2
(45) Date of Patent: Mar. 5, 2013

(54) PLATE SPRING AND VOICE COIL MOTOR

(75) Inventor: Shun-Fan Chiang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 334 days.

(21) Appl. No.: 12/842,039

(22) Filed: Jul. 23, 2010

(65) Prior Publication Data

US 2011/0043055 A1 Feb. 24, 2011

(30) Foreign Application Priority Data

Aug. 19, 2009 (CN) .......................... 2009 1 0305785

(51) Int. Cl.
*H02K 33/00* (2006.01)
*H02K 33/18* (2006.01)
*G02B 7/02* (2006.01)
*G03B 17/00* (2006.01)
*F16F 1/18* (2006.01)

(52) U.S. Cl. .................... 310/12.16; 310/12.31; 310/21; 359/824; 267/158

(58) Field of Classification Search ............... 310/12.16, 310/12.31, 15; 267/158; 359/811, 813–814, 359/824
See application file for complete search history.

(56) References Cited

U.S. PATENT DOCUMENTS

| 6,662,655 | B2 * | 12/2003 | Foote .............................. 73/493 |
| 6,867,896 | B2 * | 3/2005 | Miles ............................ 359/290 |
| 7,400,463 | B1 * | 7/2008 | Wu ............................... 359/824 |
| 7,433,136 | B2 * | 10/2008 | Ichikawa et al. ............... 359/811 |
| 7,991,278 | B2 * | 8/2011 | Chiang ........................... 396/55 |
| 2006/0028929 | A1 * | 2/2006 | Osaka ......................... 369/44.14 |
| 2008/0117536 | A1 * | 5/2008 | Higuchi ....................... 359/824 |
| 2008/0157609 | A1 * | 7/2008 | Wang ............................. 310/28 |
| 2008/0192124 | A1 * | 8/2008 | Nagasaki ................. 348/208.11 |
| 2008/0247063 | A1 * | 10/2008 | Otsuki et al. .................. 359/824 |
| 2008/0259467 | A1 * | 10/2008 | Chung .......................... 359/814 |
| 2009/0009893 | A1 * | 1/2009 | Wang ............................ 359/824 |
| 2011/0019985 | A1 * | 1/2011 | Chiu et al. ..................... 396/55 |
| 2011/0156502 | A1 * | 6/2011 | Chiang .......................... 310/38 |

* cited by examiner

*Primary Examiner* — Burton Mullins
(74) *Attorney, Agent, or Firm* — Altis Law Group, Inc.

(57) ABSTRACT

A plate spring includes holding section, first attached section, second attached section, first spring section connected between the holding section and the second attached section, and a second spring section connected between the first fixed portion and the second fixed portion. The holding section has a first edge, second edge opposite to the first edge, and a third edge. The first attached section is positioned adjacent to an intersection of the third edge and the second edge. The second attached section is positioned adjacent to an intersection of the third edge and the first edge. The first spring section has a wavy configuration and extends from an end of the first edge to the second attached section. The second spring section also has a wavy configuration and extends from an end of the second to the first attached section. The present disclosure also provides a voice coil motor.

14 Claims, 7 Drawing Sheets

PLATE SPRING AND VOICE COIL MOTOR

BACKGROUND

1. Technical Field

The present disclosure relates to plate spring and a voice coil motor, and particularly, to a plate spring and a voice coil motor used in an anti-shake camera module.

2. Description of Related Art

Lens modules and image sensors are key components of camera modules. In normal use of a camera module, light rays coming from an object, transmit through the lens module along a predetermined path and fall on a central region of the image sensor. That is, an image plane of the object is precisely on the image sensor, and thus a clear image is obtained. However, inadvertent shaking of the camera module may occur during the time that an image is captured. When this happens, either or both of the lens module and the image sensor may move slightly relative to the object. In such case, the light rays from the object may not accurately fall on the image sensor. That is, the image plane of the object may not be precisely on the image sensor, resulting in a blurry image.

What is needed, therefore, is a plate spring and a voice coil motor used in a camera which can overcome the above shortcomings.

BRIEF DESCRIPTION OF THE DRAWINGS

Many aspects of the present a voice coil motor and a plate spring can be better understood with reference to the following drawings. The components in the drawings are not necessarily drawn to scale, the emphasis instead being placed upon clearly illustrating the principles of the present plate spring and the voice coil motor. Moreover, in the drawings, like reference numerals designate corresponding parts throughout the several views.

DETAILED DESCRIPTION OF THE EMBODIMENTS

Embodiments of the present voice coil motor and plate spring will now be described in detail below and with reference to the drawings.

Figure 1:
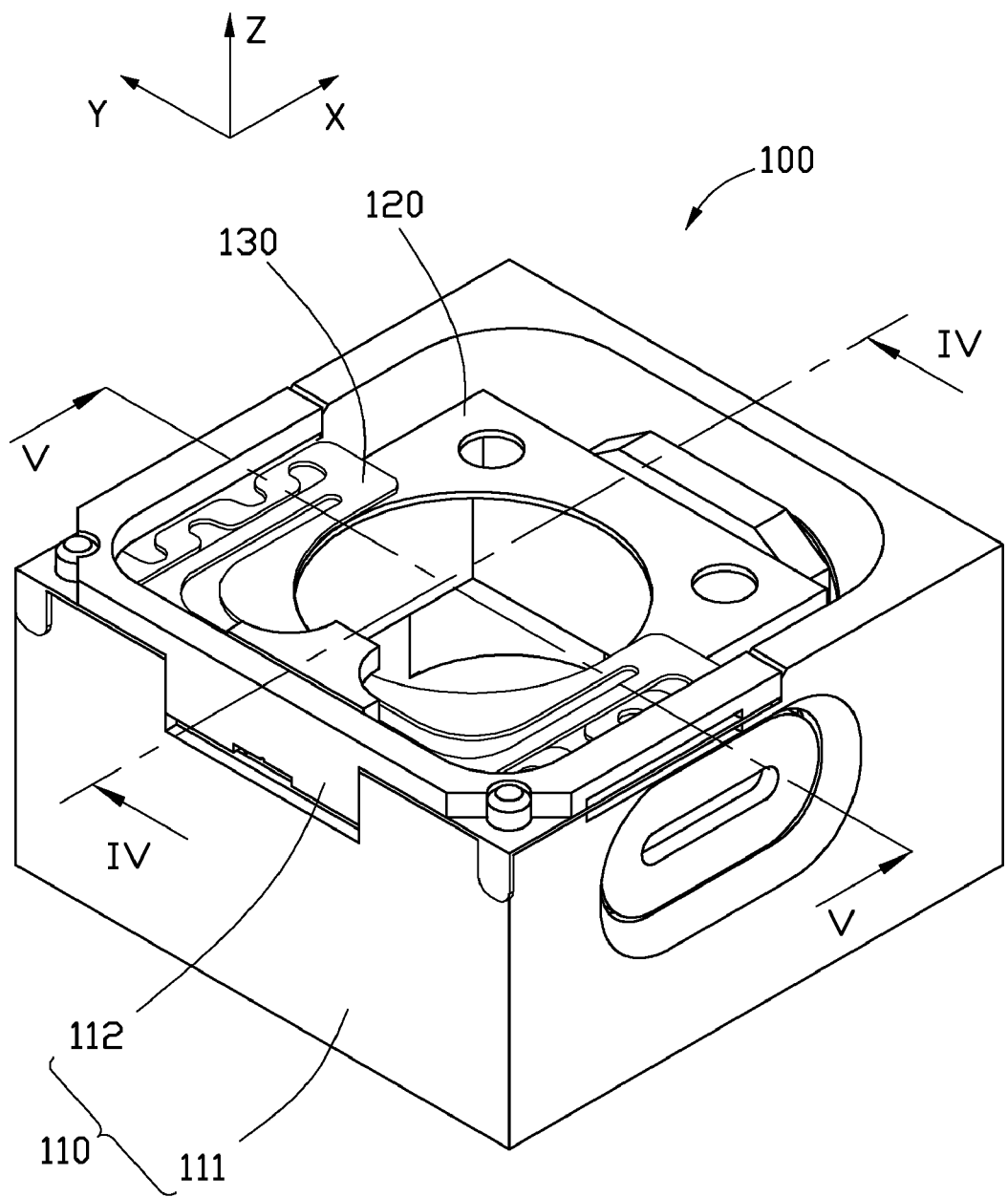
FIG. 1 is a schematic view of a voice coil motor in accordance of the first embodiment of the present disclosure.
Figure 2:
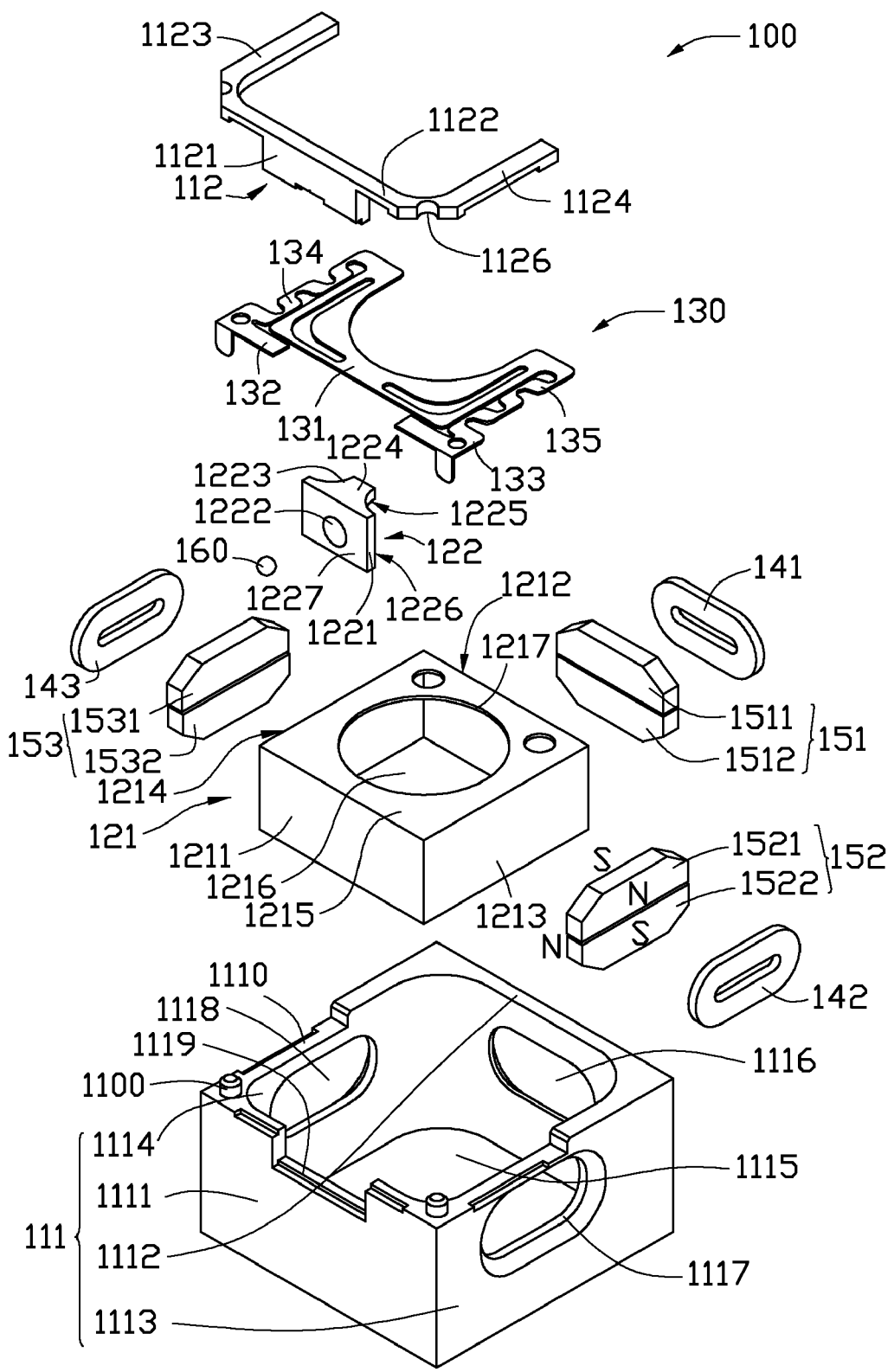
FIG. 2 is an exploded view of the voice motor of FIG. 1.
Figure 3:
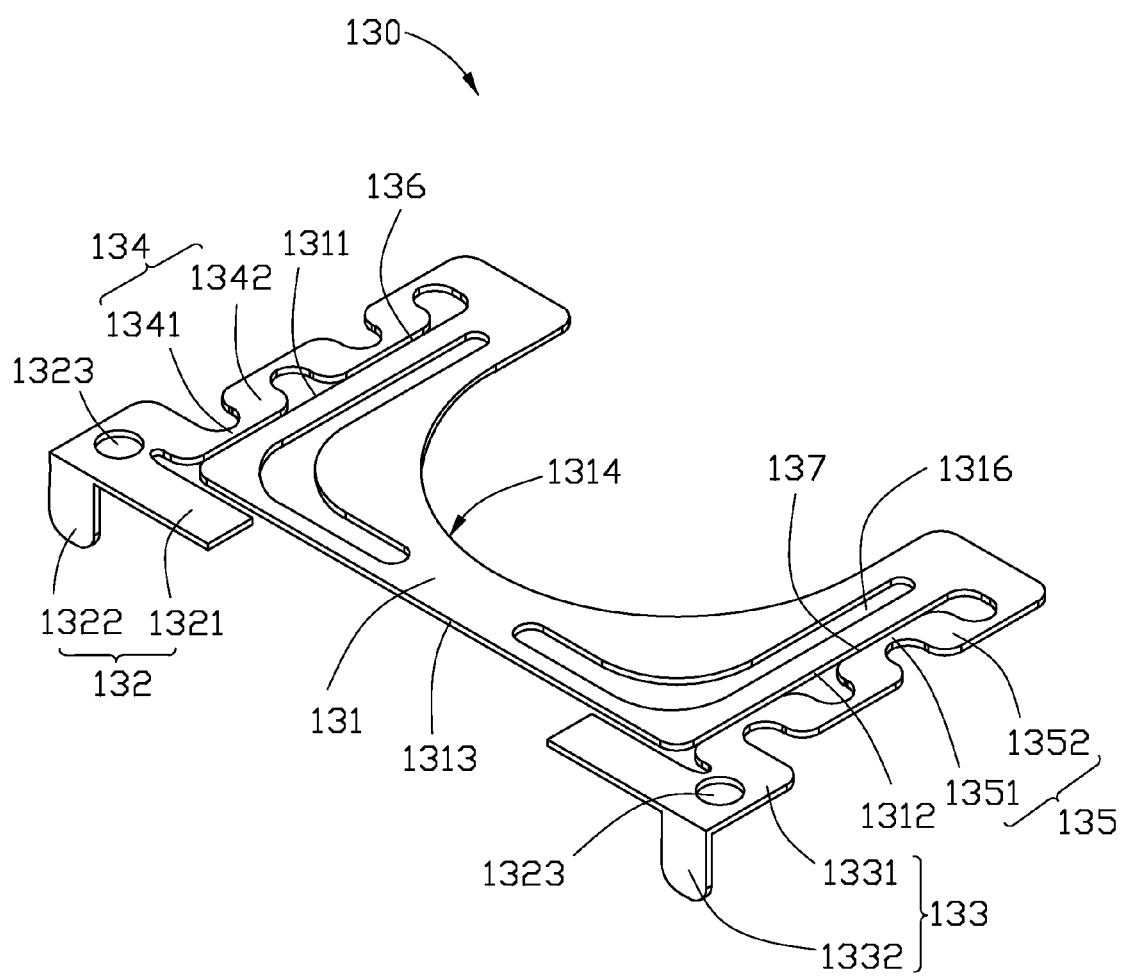
FIG. 3 is a schematic view of a plate spring in accordance of the first embodiment of the present disclosure.

Referring to FIGS. 1 and 2, an exemplary voice coil motor 100 according to an exemplary embodiment is shown. The voice coil motor 100 includes a fixing assembly 110, a movable assembly 120, a plate spring 130 connecting the movable assembly 120 to the fixing assembly 110, a first magnetic member 141, a second magnetic member 151, a third magnetic member 142, a fourth magnetic member 152, a fifth magnetic member 143, a sixth magnetic member 153, and a pivoting member 160 located between the fixing assembly 110 and the movable assembly 120.

The fixing assembly 110 includes a frame 111 and a fastening plate 112. The frame 111 has a cubical configuration, and includes a first sidewall 1111, a second sidewall 1112 opposite to the first sidewall 1111, a third sidewall 1113, and a fourth sidewall 1114 opposite to the third sidewall 1113. A first accommodating room 1115 is defined in the frame 111, surrounded by the first, second, third and fourth sidewalls 1111, 1112, 1113, and 1114. The first accommodating room 1115 is configured for receiving the movable assembly 120 therein. A hypothetic central axis of the frame 111 is defined as Z axis, a direction parallel to the first sidewall 1111 is defined as Y axis direction, and a direction perpendicular to the first sidewall 1111 is defined as X axis direction. A first through hole 1116 is defined in a central portion of the second sidewall 1112, a second through hole 1117 is defined in a central portion of the third sidewall 1113, and a third through hole 1118 is defined in a central portion of the fourth sidewall 1114. A first cutout 1119 is formed in the first sidewall 1111 at a top of the first sidewall 1111. Two second cutouts 1110 are respectively formed in the third sidewall 1113 and the fourth sidewall 1114. Two locating pins 1100 vertically protrude from the top side of the frame 111 respectively at a corner defined by the first sidewall 1111 and the fourth sidewall 1114 and a corner defined by the first wall 1111 and the third sidewall 1113.

Figure 4:
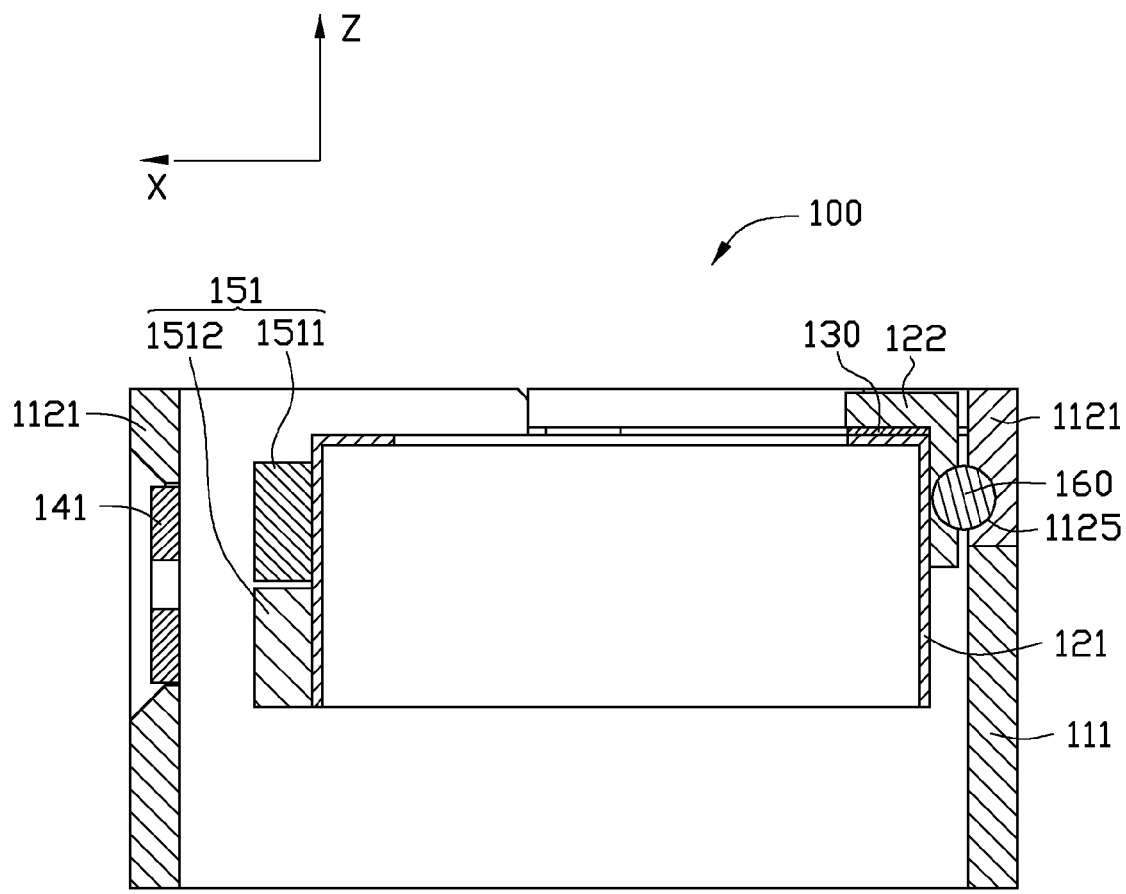
FIG. 4 is a cross-sectional view of the voice coil motor of FIG. 1, taken along line IV-IV.
Figure 5:
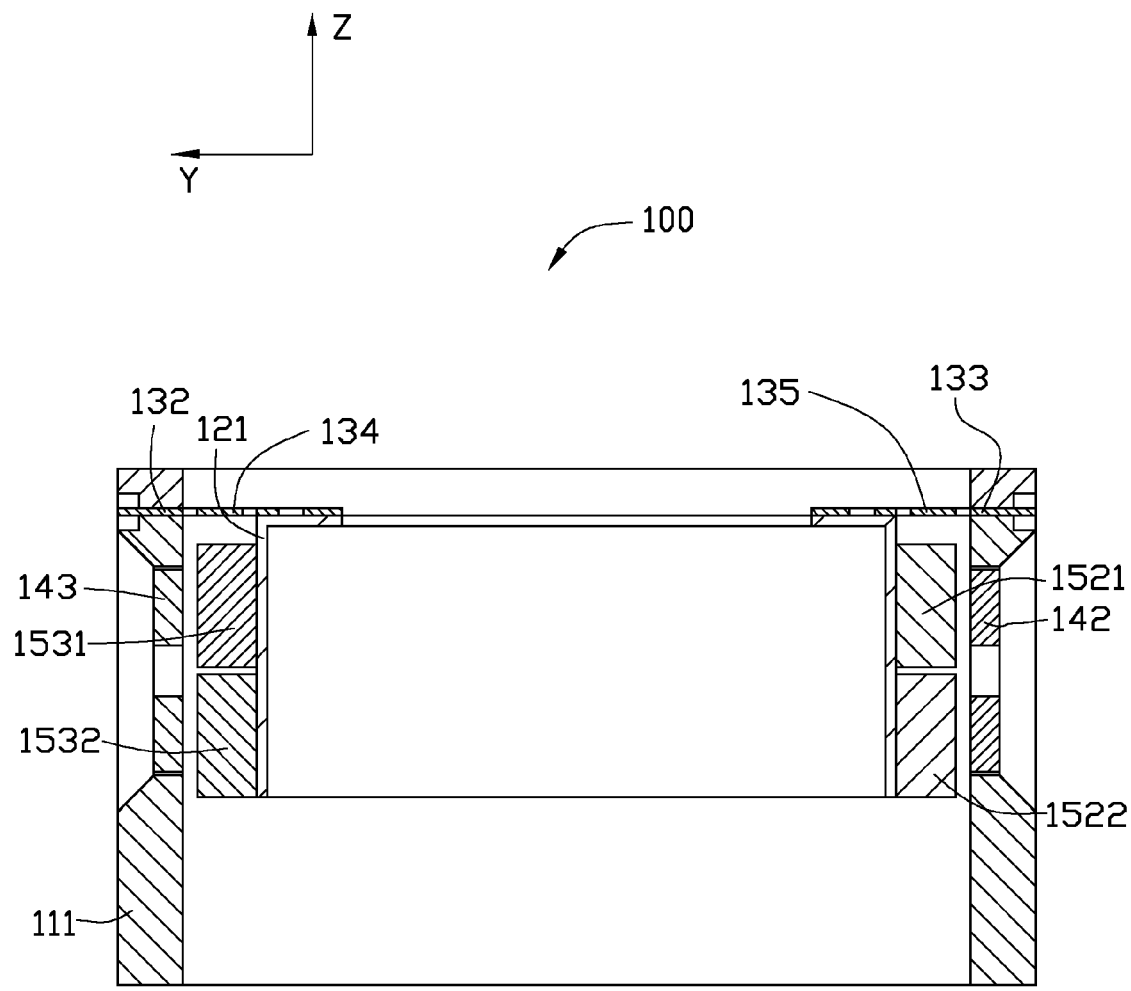
FIG. 5 is a cross-sectional view of the voice coil motor of FIG. 1, taken along line V-V.
Figure 6:
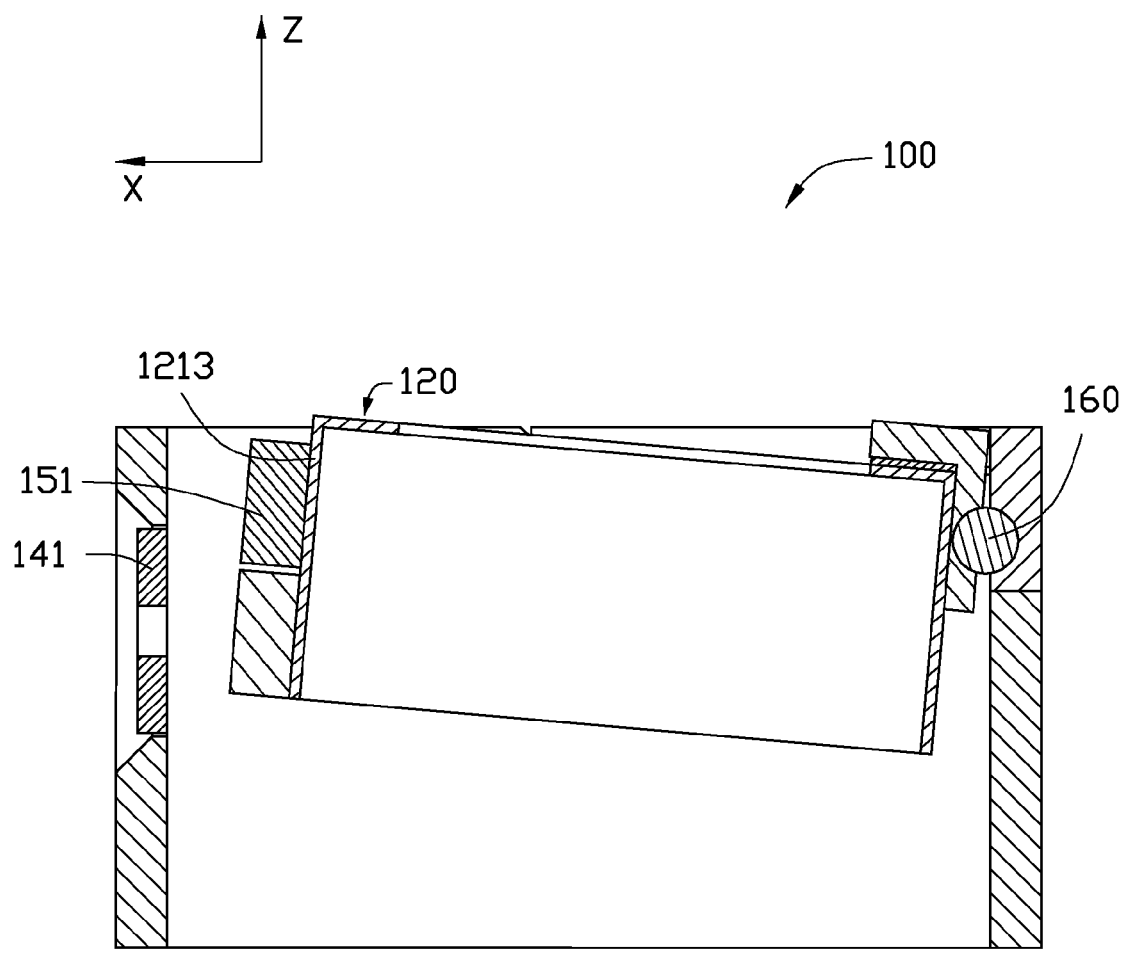
FIG. 6 is similar to 4, but showing a movable assembly is rotated to another state.
Figure 7:
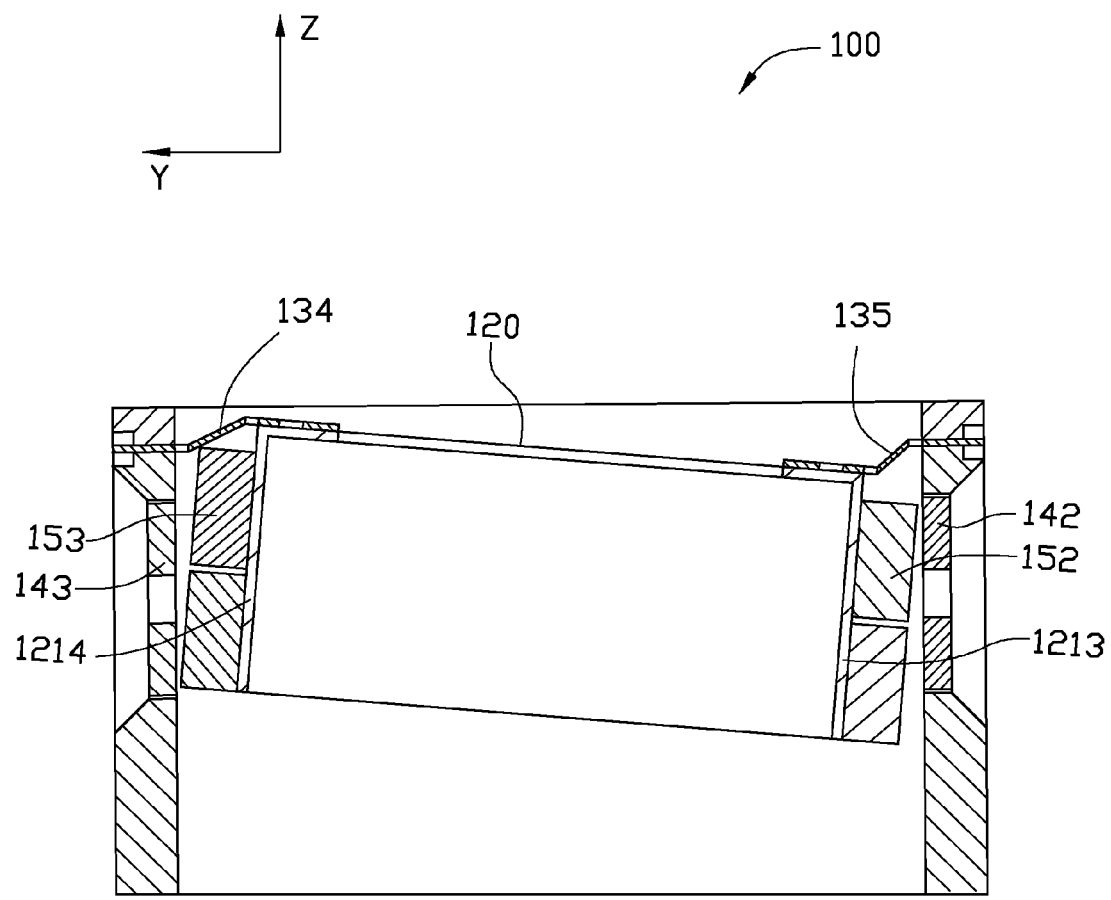
FIG. 7 is similar to 5, but showing a movable assembly may be rotated according to need.

The fastening plate 112 includes a first bar 1123, a second bar 1124 substantially parallel to the first bar 1123, a third bar 1122 interconnecting the first bar 1123 and the second bar 1124, an extending body 1121 and two recesses 1126. The first bar 1123, the second bar 1124, and the third bar 1122 lie in a same plane and cooperatively form a "U" configuration, and the two recesses 1126 are respectively formed at the two corners of the "U" configuration. In the exemplary embodiment, the two recesses 1126 are two though holes extending along a direction perpendicular to the plane defined by the first bar 1123, the second bar 1124, and the third bar 1122. The extending body 1121 extends downwards from a bottom of the third bar 1122, and the extending body 1121 is substantially perpendicular to the plane defined by the first bar 1123, the second bar 1124, and the third bar 1122. The first bar 1123 and the second bar 1124 are engaged with the second cutouts 1110, the recesses 1126 are engaged with the locating pins 1100, and the third bar 1122 together with the extending body 1121 is engaged in the cutout 1119, thereby fastening the fastening plate 112 to the frame 111. Referring to FIG. 4, a first spherical recess 1125 is formed in a surface of the extending body 1121, which faces the second sidewall 1112 of the frame 111. The first spherical recess 1125 is configured for partially receiving the pivoting member 160.

The movable assembly 120 includes a housing 121 and a connecting block 122. The housing 121 is accommodated in the first accommodating room 1115 of the frame 111. The housing 121 includes a first sidewall 1211, a second sidewall 1212 opposite to the first sidewall 1211, a third sidewall 1213, a fourth sidewall 1214 opposite to the third sidewall 1213, and a cover 1215 having a through hole 1217 formed in the central portion thereof. A second accommodating room 1216 is defined in the housing 121, and surrounded by the first sidewall 1211, the second wall 1212, the third wall 1213, the fourth wall 1214 and the cover 1215. The second accommodating room 1216 is configured for accommodating a lens assembly therein.

A cross sectional shape of the connecting block 122 is similar to an "L" shape. The connecting block 122 includes a first arm 1223 and a second arm 1221. The first arm 1223 includes a first surface 1224 and a second opposite surface 1225. The second surface 1225 of the first arm 1223 faces a top surface of the cover 1215 of the housing 121. The second arm 1221 includes a first surface 1226 and a second opposite surface 1227. The first surface 1226 of the second arm 1221 is fixed to an outer surface of the first sidewall 1211. The second surface 1227 of the second arm 1221 faces the fastening plate 112 and is spaced apart from the fastening plate 112. A second spherical recess 1222 is formed in the second surface 1127 of the second arm 1221 and configured for partially receiving the pivoting member 160. The second spherical recess 1222 aligns with the first spherical recess 1125 of the fastening plate 112. The pivoting member 160 is a ball bearing, and engagingly received in and between the first spherical recess 1222 and the second spherical recess 1125.

The plate spring 130 is formed of a metal material having high resilience, for example, cooper or the like, and a thickness direction thereof coincide with the optical axis direction of the lens assembly accommodated in the second accommodating room 1216. Referring to FIG. 2, in the plate spring 130, a holding section 131, a first attached section 132, a second attached section 133, a first spring section 134, and a second spring section 135 are formed as a unitary piece. The first spring section 134 is interconnected between the first attached section 132 and the holding section 131. The second spring section 135 is interconnected between the second attached section 133 and the holding section 131.

The holding section 131 is sandwiched between the second surface 1225 of the first arm 1223 and the top surface of the cover 1215. The holding section 131 is formed into a substantially "U" shaped plate having a first edge 1311, a second edge 1312 opposite to the first edge 1311, a third edge 1313, and a substantially circular arc shaped edge 1314 opposite to the third edge 1313. The first edge 1311 is substantially parallel to the second edge 1312. The third edge 1313 is substantially perpendicular to the first edge 1311 and the second edge 1312. The substantially circular arc shaped edge 1314 is curved in to allow the light reach the second accommodating room 1216 through the through hole 1217. In the present embodiment, two substantially "L" shaped slots 1316 are formed in the holding section 131 respectively adjacent the first edge 1311 and the second edge 1312 primarily to reduce weight of the plate spring 130.

The first attached section 132 includes a first fixed plate 1321 and a second fixed plate 1322. The first fixed plate 1321 and the holding section 131 lie in a same plane. The first fixed plate 1321 is located adjacent to a intersection of the first edge 1311 and the third edge 1313 and spaced with the third edge 1313. In the exemplary embodiment, the first fixed plate 1321 is a substantially rectangular plate. The extending direction of the first fixed plate 1321 is substantially parallel to the third edge 1313 of the holding section 131. The second fixed plate 1322 is folded at a substantially right angle. In the exemplary embodiment, the second fixed plate 1322 is a substantially rectangular plate. The extending direction of the second fixed plate 1322 is substantially perpendicular to the plane defined by the first fixed plate 1321 and the holding section 131. The second fixed plate 1322 is substantially parallel to the third edge 1313 of the holding section 131. A first through hole 1323 is defined in the first fixed plate 1321 and extending along a direction perpendicular to the first fixed plate 1321. The first through hole 1323 is engaged with one of the locating pins 1100 at the corner defined by the first sidewall 1111 and the fourth sidewall 1114.

The second attached section 133 and the first attached section 132 are symmetric with respect to a central axis of the holding section 131. The second attached section 133 includes a third fixed plate 1331 and a fourth fixed plate 1332. A second through hole 1333 is defined in the third fixed plate 1331 and extending along a direction perpendicular to the third fixed plate 1331. The first fixed plate 1321 and the third fixed plate 1331 are sandwiched between the third bar 1122 of the fastening plate 112 and the top surface of the first sidewall 1111 of the frame 111. The second fixed plate 1322 and the fourth fixed plate 1331 attach to an outer surface of the first sidewall 1111.

The first spring section 134 is configured for providing elasticity between the holding section 131 and the first attached section 132. The first spring section 134 is adjacent to the first edge 1311 of the holding section 131. The first spring section 134 is extending along a direction substantially parallel to the first edge 1311. A first gap 136 is defined between the first edge 1311 and the first spring section 134. A length of the first spring section 134 is substantially equal to a length of the first edge 1311. An end of the first spring section 134 connects to a corner of holding section 131 defined by the first edge 1311 and the substantially circular arc shaped edge 1314, an opposite other end of the first spring section 134 connects to the first fixed plate 1321.

The first spring section 134 is a plate-shaped and has a wavy configuration. The wavy configuration may be a sine wave, a cosine wave, a triangular wave, a square wave and so on. In the exemplary embodiment, the waveform of the first spring section 134 is a square wave. The first spring section 134 includes a number of first connecting sections 1341 and a number of second connecting sections 1342. The first connecting sections 1341 and the second connecting sections 1342 connect to each other alternately.

Only one first connecting section 1241 connects between two second connecting sections 1342. Only one second connecting section 1342 connects between two first connecting sections 1342. The extending directions of the first connecting sections 1341 and the second connecting sections 1342 are substantially perpendicular to each other. The first connecting sections 1341 are extending along a direction substantially parallel to the first edge 1311.

It is understood that an angle between the first connecting sections 1341 and the first edge 1311 also may be an acute angle or an obtuse angle. An angle between the first connecting sections 1341 and the second connecting sections 1342 may be an acute angle or an obtuse angle.

The second spring section 135 is configured for providing elasticity between the holding section 131 and the second attached section 133. The second spring section 135 is plate-shaped. The second spring section 135 and the first spring section 134 are symmetric with respect to the central axis of the holding section 131 and lie in a common plane. In other words, the first spring section 134 and the second spring section 135 at the opposite sides of the movable assembly 120. The second spring section 135 is adjacent to the second edge 1312 of the holding section 131. The second spring section 135 is extending along a direction substantially parallel to the second edge 1312. A second gap 137 is defined between the second edge 1312 and the second spring section 135. A length of the second spring section 134 is substantially equal to the length of the second edge 1312. An end of the second spring section 135 connects to a intersection of the second edge 1312 and the substantially circular arc shaped edge 1314, the opposite other end of the second spring section 135 connects to the first fixed plate 1321.

The second spring section 135 also has a wavy configuration. The wavy configuration may be a sine wave, a cosine wave, a triangular wave, a square wave and so on. In the exemplary embodiment, the wavy configuration of the second spring section 135 is a square wave. The second spring section 135 includes a number of third connecting sections 1351 and a number of fourth connecting sections 1352. The third connecting sections 1351 and the fourth connecting sections 1352 connect each other alternately. Only one third connecting section 1351 connects between two fourth connecting sections 1352, only one fourth connecting section 1352 connects between two first connecting sections 1351. The extending directions of the third connecting sections 1351 and the fourth connecting sections 1352 are substantially perpendicular to each other. The third connecting sections 1341 are extending along a direction substantially parallel to the second edge 1312. An angle between the third connecting sections 1351 and the second edge 1312 also may be acute or obtuse. An angle between the third connecting sections 1351 and the fourth connecting sections 1352 may be acute or obtuse.

The first magnetic member 141, the third magnetic member 142, and the fifth magnetic member 143 are electromagnetic members, e.g., coils of wire. The first magnetic member 141 is retained in the first through hole 1116, the third magnetic member 142 is retained in the second through hole 1117, and the fifth magnetic member 143 is retained in the third through hole 1118.

The second magnetic member 151 is fixed to the second sidewall 1212, the fourth magnetic member 152 is fixed to the third sidewall 1213, and the sixth magnetic member 153 is fixed to the fourth sidewall 1214. The second, fourth and sixth magnetic members 151, 152, and 153 each include a top permanent magnet 1511, 1521, and 1531 and a bottom permanent magnet 1512, 1522, and 1532. In the present embodiment, each of the top permanent magnets 1511, 1521, and 1531 has a single S polarity side adjacent to the housing 121, and a single N polarity side opposite to the S polarity side. Each of the bottom permanent magnet 1512, 1522, and 1532 has a single N polarity side adjacent to the housing 121, and a single S polarity side opposite to the N polarity side. Each of the top permanent magnet 1511, 1521, and 1531 and each of the bottom permanent magnet 1512, 1522, and 1532 can be made by a magnetization method. With the above configuration, when a current is applied to each of the first magnetic member 141, the third magnetic member 142 and the fifth magnetic member 143, the second magnetic member 151, the fourth magnetic member 152 and the sixth magnetic member 153 cooperatively are able to move along the Z axis as defined. That is, under the driving force given by all of the second magnetic members 151, the fourth magnetic member 152 and the sixth magnetic member 153, the housing 121 moves substantially along the Z axis.

Referring also to FIGS. 4, 5, 6 and 7, when one of the second magnetic members 151, the fourth magnetic member 152 and the sixth magnetic member 153 is subject to a force substantially along a direction of the Z axis, i.e., the corresponding one of the first magnetic member 141, the third magnetic member 142 and the fifth magnetic member 143 has a current applied, due to the pivoting member 160, the housing 121 may rotate certain angles about the Y axis or the X axis. Elastic distortion occurs in first spring section 134 and the second spring section 135. When the voice coil motor 100 is applied in a camera, the rotation of the housing 121 to the fixed assembly 100 may overcome the inadvertent shaking of the camera module. When the current applied in one of the first magnetic member 141, the third magnetic member 142 and the fifth magnetic member 143 is stopped, the elastic distortion of the first spring section 134 and the second spring section 135 would disappear or diminish, and the first spring section 134 and the second spring section 136 would drive the holding section 131 together with the movable assembly 120 to return an initial form.

It is understood that when two and not all of the second magnetic members 151, the fourth magnetic member 152 and the sixth magnetic member 153 are subject to a force substantially along a direction of the Z axis, due to the pivoting member 160, the housing 121 may also rotate certain angles about the Y axis or the X axis.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A plate spring comprising:
a holding section comprising a first edge, a second edge opposite to the first edge, and a third edge connecting the first edge and the second edge;
a first attached section adjacent to an corner defined by the third edge and the first edge;
a second attached section adjacent to an corner defined by the third edge and the second edge;
a first spring section interconnecting the holding section and the first attached section, extending from an opposite end of the first edge to the third edge to the first attached section, and having a wavy configuration; and
a second spring section interconnecting the holding section and the second attached section, extending from an opposite end of the second edge to the third edge to the second attached section, and having a wavy configuration.

2. The plate spring as described in claim 1, wherein the first edge is substantially parallel to the second edge, the first spring section, as a whole, extending along a direction substantially parallel to the first edge, the second spring section, as a whole, extending along a direction substantially parallel to the second edge.

3. The plate spring as described in claim 1, wherein the first spring section and the second spring section are symmetric with respect to a central axis of the holding section.

4. The plate spring as described in claim 3, wherein the first attached section and the second attached section are symmetric with respect to the central axis of the holding section.

5. The plate spring as described in claim 1, wherein the holding section, the first spring section, and the second spring section are plate-shaped and lie in a common plane.

6. The plate spring as described in claim 1, wherein the holding section, the first attached section, the second attached section, the first spring section, and the second spring section are formed as a unitary piece.

7. The plate spring as described in claim 1, wherein the wavy configuration of the first spring section and the second spring section is selected from the group consisting of a sine wave, a cosine wave, a triangular wave, and a square wave.

8. The plate spring as described in claim 1, wherein a first gap is defined between the first spring section and the first edge, and a second gap is defined between the second spring section and the second edge.

9. The plate spring as described in claim 8, wherein the first and second attached sections are spaced from the holding section.

10. A voice coil motor comprising:
a fixing assembly comprising a frame;
a movable assembly comprising a housing accommodated in the frame;

a plate spring comprising a holding section, a first attached section, a second attached section, a first spring section, and a second spring section, the holding section comprising a first edge, a second edge opposite to the first edge, and a third edge connecting the first edge and the second edge, the holding section being fixed to the housing, the first attached section adjacent to an intersection of the third edge and the first edge, the first attached section being fixed to the frame, the second attached section adjacent to an intersection of the third edge and the second edge, the second attached section being fixed to the frame, the first spring section interconnecting the holding section and the first attached section, extending from an opposite end of the first edge to the third edge to the first attached section, and having a wavy configuration, the second spring section interconnecting the holding section and the second attached section, extending from an opposite end of the second edge to the third edge to the second attached section, and having a wavy configuration;

a pivoting member mounted between the fixing assembly and the movable assembly, a plurality of first magnetic member mounted on the movable assembly;

a plurality of second magnetic member being mounted on the fixed assembly, the second magnetic member facing the respective first magnetic members, the first magnetic members and the second magnetic members being configured for cooperating to drive the movable assembly to rotate around the pivot member.

11. The voice coil motor as described in claim 10, wherein the fixing assembly further comprises a fastening plate fastening the first attached section and the second attached section to the frame.

12. The voice coil motor as described in claim 10, wherein the movable assembly further comprises a connecting block fixed on the housing and facing the fastening plate, each of the connecting block and the fastening plate has a spherical recess defined therein, the pivoting member is engagingly received in and between the spherical recesses.

13. The voice coil motor as described in claim 10, wherein each of the first magnetic members is a coil of wire, each of the second magnetic member comprises a top permanent magnet and a bottom permanent magnet, each of the top permanent magnets comprises one of single N magnetic polarity and single S magnetic polarity facing the corresponding first magnetic member, and each of the bottom permanent magnets comprises the other of single N magnetic polarity and single S magnetic polarity facing the corresponding first magnetic member.

14. A voice coil motor comprising:

a fixed assembly comprising a cubical frame;

a movable assembly comprising a housing received in the frame;

a plate spring comprising a holding section, a first attached section, a second attached section, a first spring section, and a second spring section, the holding section comprising a first edge, a second edge at an opposite side thereof to the first edge, and a third edge connecting the first edge and the second edge, the holding section being fixed to the housing, the first attached section adjacent to an intersection of the third edge and the first edge, the first attached section being fixed to the frame, the second attached section adjacent to an intersection of the third edge and the second edge, the second attached section being fixed to the frame, the first spring section interconnecting the holding section and the first attached section, extending from an opposite end of the first edge to the third edge to the first attached section, and having a wavy configuration, the second spring section interconnecting the holding section and the second attached section, extending from an opposite end of the second edge to the third edge to the first attached section, and having a wavy configuration;

a pivoting member mounted between the fixing assembly and the movable assembly;

three electromagnets mounted on three inner sides of the cuboid frame;

three permanent magnets being mounted on three outer sides of the housing, the electromagnets facing the respective permanent magnets, the electromagnets and the permanent magnets being configured for cooperating to drive the movable assembly to rotate around the pivot member.

* * * * *